(12) United States Patent
Reass et al.

(10) Patent No.: US 6,754,091 B2
(45) Date of Patent: Jun. 22, 2004

(54) PULSE WIDTH MODULATED PUSH-PULL DRIVEN PARALLEL RESONANT CONVERTER WITH ACTIVE FREE-WHEEL

(75) Inventors: William A. Reass, Los Alamos, NM (US); Louis Schrank, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 167 days.

(21) Appl. No.: 10/198,564

(22) Filed: Jul. 18, 2002

(65) Prior Publication Data

US 2004/0012984 A1 Jan. 22, 2004

(51) Int. Cl.[7] .............................................. H02M 3/315
(52) U.S. Cl. ......................... 363/25; 363/133; 363/97; 363/56.06
(58) Field of Search ............................ 363/24, 25, 26, 363/56.01, 56.12, 95, 97, 131, 133, 134, 56.06, 56.07; 315/209 R, 219, 221, 225, 226; 361/93.9; 323/908

(56) References Cited

U.S. PATENT DOCUMENTS 5,293,308 A * 3/1994 Boys et al. .................... 363/37
5,381,327 A * 1/1995 Yan ............................... 363/24
6,018,467 A * 1/2000 Majid et al. ................... 363/16

* cited by examiner

Primary Examiner—Michael Sherry
Assistant Examiner—Gary L. Laxton
(74) Attorney, Agent, or Firm—DeWitt M. Morgan; Ray G. Wilson

(57) ABSTRACT

An apparatus and method for high frequency alternating power generation to control kilowatts of supplied power in microseconds. The present invention includes a means for energy storage, push-pull switching means, control electronics, transformer means, resonant circuitry and means for excess energy recovery, all in electrical communication. A push-pull circuit works synchronously with a force commutated free-wheel transistor to provide current pulses to a transformer. A change in the conduction angle of the push-pull circuit changes the amount of energy coupled into the transformer's secondary oscillating circuit, thereby altering the induced secondary resonating voltage. At the end of each pulse, the force commutated free-wheel transistor causes residual excess energy in the primary circuit to be transmitted back to the storage capacitor for later use.

18 Claims, 6 Drawing Sheets o - CONNECTION POINT
⊘ - CORONA RING

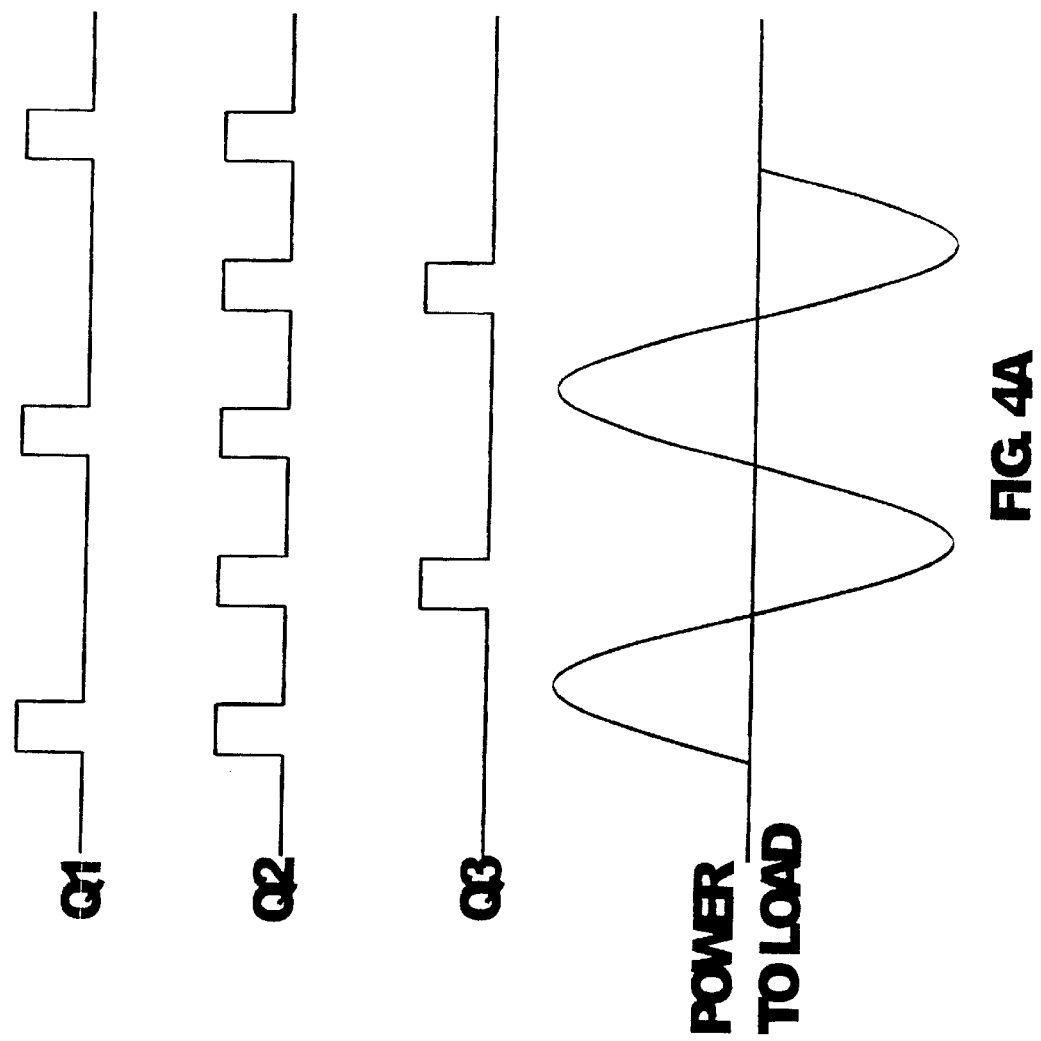

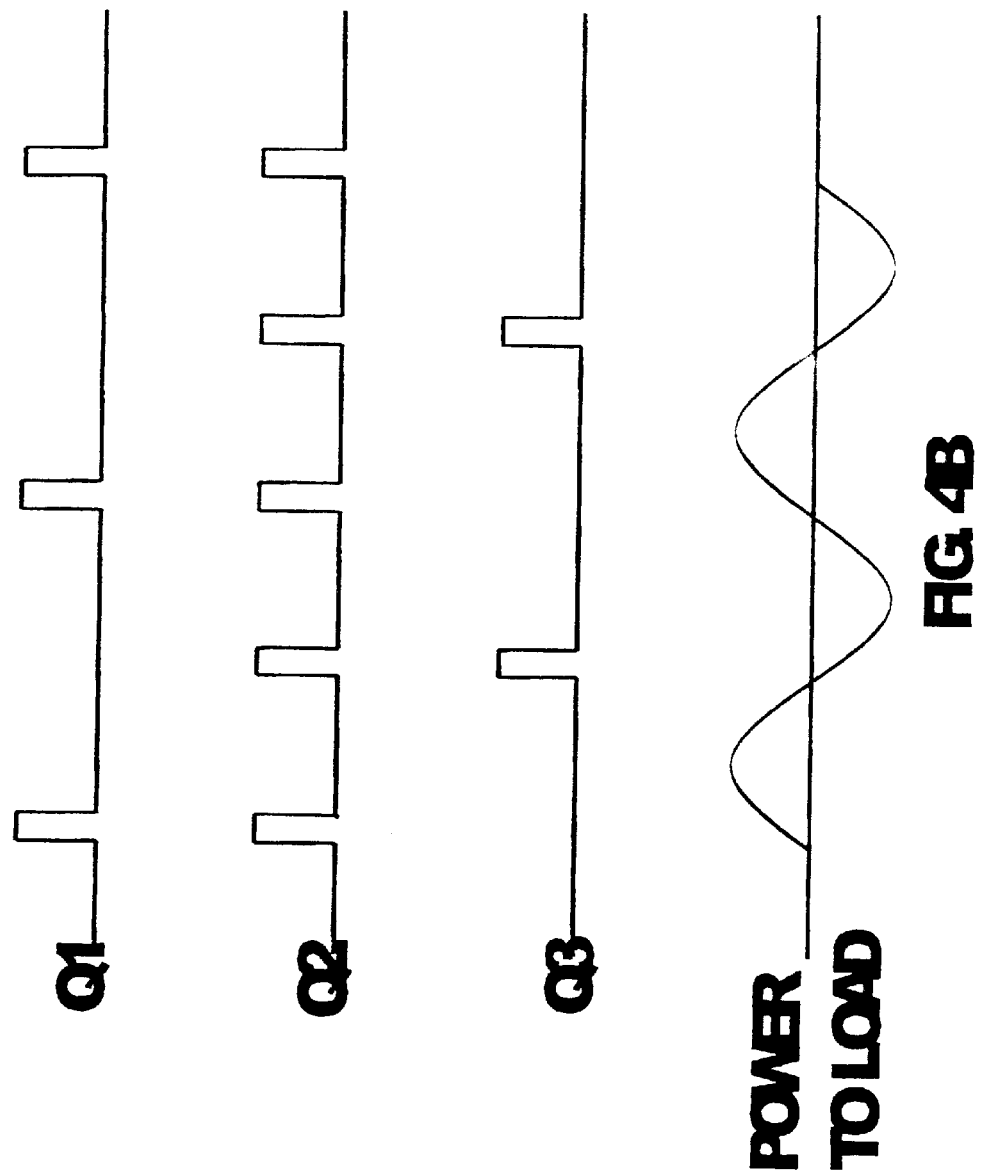

PULSE WIDTH MODULATED PUSH-PULL DRIVEN PARALLEL RESONANT CONVERTER WITH ACTIVE FREE-WHEEL

This invention was made with Government support, Contract Number W-7405-ENG-36 awarded by the United States Department of Energy to The Regents of the University of California. The Government has certain rights in the invention.

FIELD OF THE INVENTION

The present invention relates generally to an apparatus and method of power conversion to efficiently convert a DC voltage to a high frequency and high voltage AC waveform with high power capability for a variety of applications, including pollution control, environmental remediation equipment, and medical apparatus. Specifically, the present invention relates to an optically controlled power converter which incorporates push-pull technology and an efficient transformer (with a 0.999% coupling) to produce a high voltage and high frequency waveform for a load (such as, for example, a dielectric barrier plasma discharge) by conditioning the input power supplied to the load while also recovering and storing unused converted energy, for subsequent use by the load.

BACKGROUND OF THE INVENTION

High frequency and high voltage waveforms with high power capability are used in various industrial, commercial and military applications, such as in environmental remediation equipment and processes.

In the past, equipment for the creation of such waveforms required the use of series resonant converters, which are electrically inefficient because of the circuit topology employed. A series resonant converter uses a step-up transformer with a high leakage inductance to resonate with the load capacitance. Additional resonant capacitors are located on the transformer primary. The transformer conducts electricity for the full 360 degree cycle. In such systems, the winding resistance of the primary and secondary transformer windings, along with the losses of the oscillating circuitry, contribute to an inordinately high total energy loss. Thus, for example, a typical prior art system designed to deliver 15 kilowatts (kW) is likely only to deliver 3 kW of power to the load. Another disadvantage of series resonant converters is that they must employ switching transistors to switch for a full 180 degree conduction angle and operate almost exactly at the resonate frequency to avoid large destructive transient voltages. Finally, these types of systems are bulky, heavy, require large amplifiers to drive loads through variable frequencies, are limited in output power, and are quite expensive to operate. Thus, a highly efficient, high frequency power converter is needed for applications which require a large amount of power.

Accordingly, it is an object of the present invention to provide high frequency, high voltage AC power that includes operation at up to 25 kHz, 25 kW with high efficiencies.

It is another object of the present invention to provide for efficiencies up to 85%.

It is another object of the present invention to provide variable power (to 25 kW) by changing the pulse duration of pulse-pairs, by regulating the applied voltage.

It is still another object of the present invention to match the timing of the switching transistors to the timing of the load, to optimize power transfer.

It is still another object of the invention to vary the voltage by changing the individual pulse width of the power switching transistors.

It is yet another object of the present invention to control power switching with the use of insulated gate bipolar transistors (IGBTs).

It is yet still another object of the present invention to provide a pulse width modulated, push-pull driven parallel resonant converter which has an energy recovery system.

It is yet still another object of the present invention to provide a pulse width modulated, push-pull driven parallel resonant converter with an active free-wheel.

It is an additional object to provide a transformer: (1) which is highly efficient; (2) has a better than 0.999 coupling coefficient; (3) in which both sides of the transformer receive power and transmit power on both sides of the positive and negative sine wave; and (4) which has multiple windings arranged such that the high voltage output is shielded by components near ground potential which, in turn, permits higher voltage with improved efficiency.

It is an additional object of the present invention to provide a step up power converter using transistors configured in a push-pull circuit with a multiple winding transformer to couple power efficiently to a resonant load.

It is a further object of the present invention to provide a step up power converter which drives any load by conditioning the input power supplied to the load while also recovering and storing unused energy for subsequent use by the load.

Additional design advantages and novel features of the invention will be evident from the drawings and the description set forth herein.

SUMMARY OF THE INVENTION

The present invention is a highly efficient, high frequency power generator for applications which require a large amount of power (over 5 kW) in either a pulse or continuous mode. The present invention utilizes an optically controlled power converter to control kilowatts (or more) of supplied power in microseconds by employing an input rectifier, an energy storage network, a resonant power switching mechanism, control electronics optically coupled to the resonant power switching mechanism, a coupling transformer, a secondary oscillating circuit having the load, and electronics for energy recovery. The power converter of the present invention employs pulse width modulation techniques to deliver short pulses of energy to a secondary oscillating circuit (which is coupled to the load to be driven) to provide regulation and control. The electrically controllable conduction angle of the secondary oscillating circuit determines the amount of energy delivered to the load and, thus, can be used to regulate the output voltage. The resonant power switching mechanism employs a free-wheel transistor which allows the remaining energy in the current limiting inductor included in the transformer primary circuit to be returned to an energy storage capacitor via the energy recovery network, maintaining a high system efficiency in addition to avoiding the large transients from off-frequency operation.

The transformer of the present invention has a better than 0.999 coupling coefficient. It has multiple windings arranged such that the high voltage output is shielded by components near ground potential which, in turn, permits higher voltage with improved efficiency. Further, both sides of the transformer receive power and transmit power on both sides of the positive and negative sine wave.

The novel features of the present invention will become apparent to those of skill in the art upon examination of the detailed description or can be learned by practice of the invention. It should be understood, however, that the detailed description is provided for illustration purposes only. Various changes and modifications within the scope of the invention will become apparent to those of skill in the art from the detailed description of the invention and claims that follow.

BRIEF DESCRIPTION OF THE DRAWINGS

FIGS. 4A and 4B are schematics how the variation in pulse width affects the output power and voltage.

DETAILED DESCRIPTION OF THE INVENTION

Figure 1:
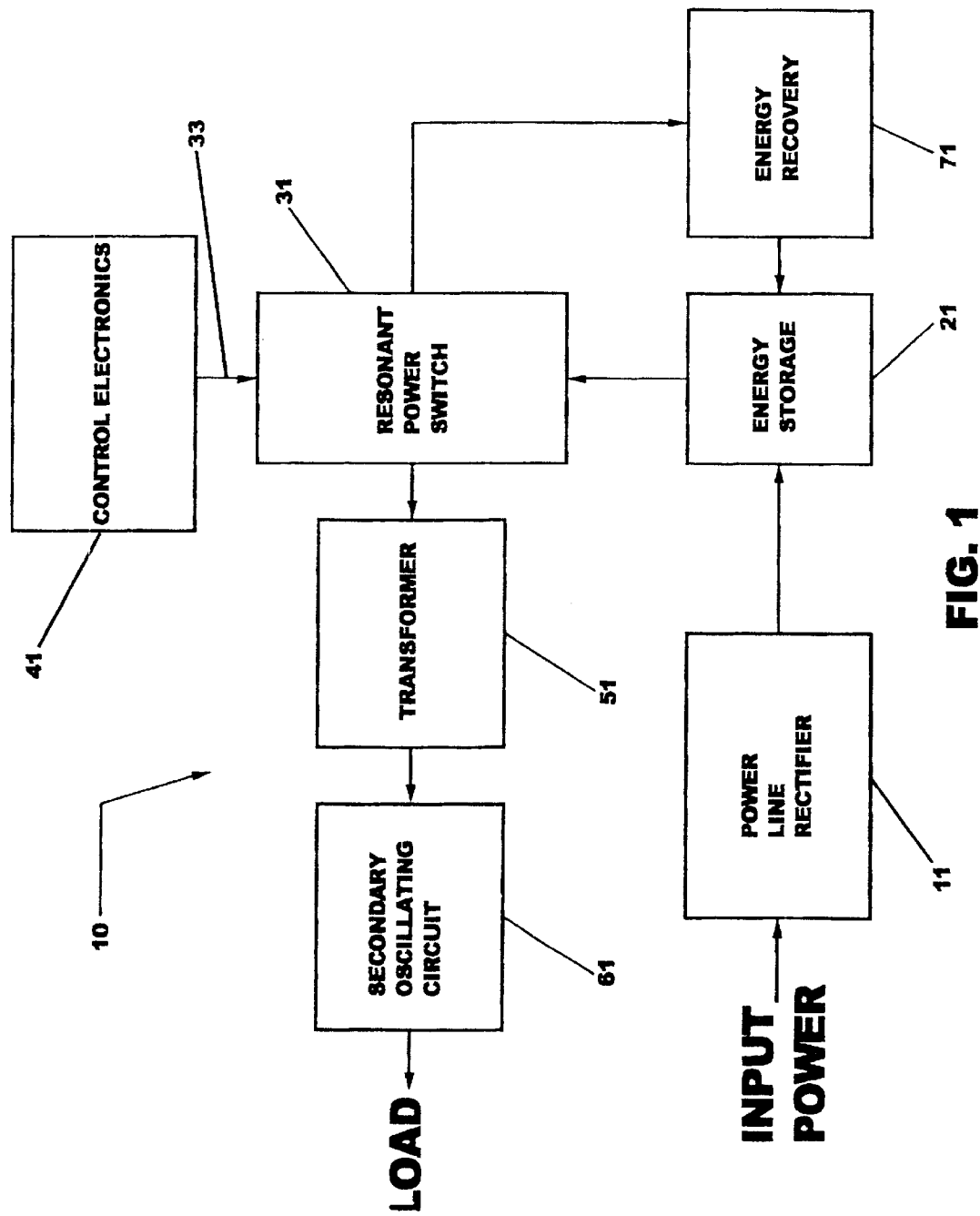
FIG. 1 is a block diagram of the preferred embodiment of the present invention, illustrating the basic functional assemblies of the resonant converter.

As seen in FIG. 1, optically controlled power converter 10 includes an input power line rectifier 11, energy storage circuitry 21, resonant power switch 31, network control electronics 41, transformer 51, secondary oscillating circuit 61, and an energy recovery network 71.

In the high power applications, for which the present invention is suited, three phase input power is typically required (e.g., 480 volts in industrial applications). This AC power is converted to direct current by a conventional rectifier 11. Because the whole system, including rectifier 11, floats with the utility input power grid, isolation transformers are unnecessary. Further, because the present invention operates at the input power source's voltage level (e.g., 480 volts), power line rectifier 11 further increases overall system efficiency and minimizes high power components and related physical size. If DC input power is used, rectifier 11 would be unnecessary.

Figure 2:
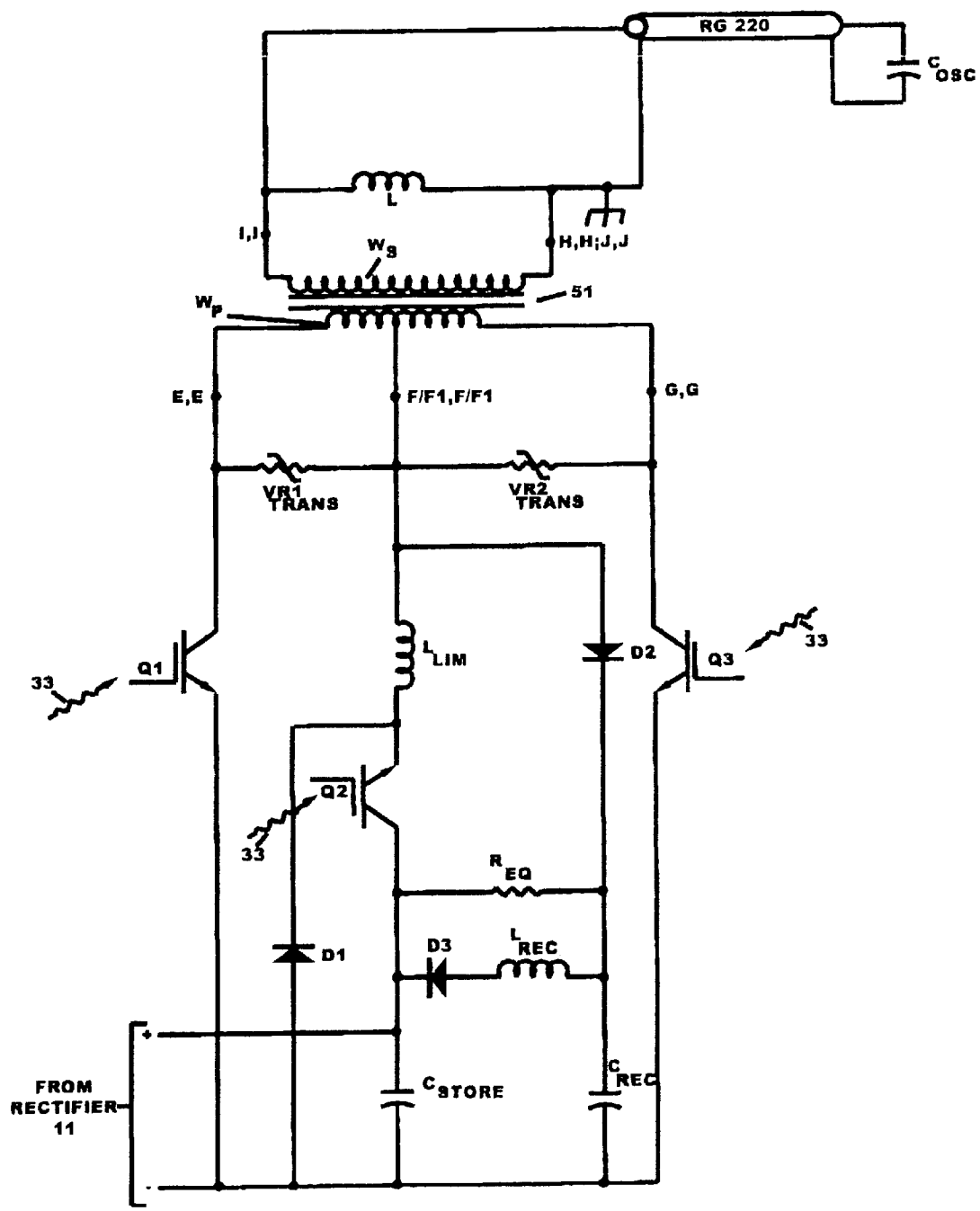
FIG. 2 is an electrical schematic illustrating the preferred embodiment of the present invention.

With reference to FIG. 2, energy storage circuitry 21 includes capacitor $C_{STORE}$, which stores electrical energy originating from the input power source and that also recycled from $C_{REC}$ of energy recovery electronics 71. Diodes D1 and D2 free-wheel the leftover energy from each pulse and transmit that energy to $C_{REC}$ via the forced commutation of transistor Q2. $C_{STORE}$ is then recharged through $L_{REC}$ and diode D3.

The resonant power switching network 31 includes optional transient network varistors $VR1_{TRANS}$ and $VR2_{TRANS}$, current limiting inductor $L_{LIM}$, and transistors Q1, Q2 and Q3. All three transistors all controlled and driven by control electronics 41, via optic coupling 33. Transistors Q1, Q2 and Q3 are arranged in a push-pull circuitry arrangement operating at a predetermined conduction angle, preset by conventional control electronics 41, that generate the ultimately desired voltage AC signal across the secondary oscillating circuit $L_{OSC}$ of secondary oscillating circuitry 61. Transistor Q2 is an active free-wheel transistor and operates synchronously with transistors Q1 and Q3. By modifying the conduction angle of the push-pull circuitry (and, thus, modifying the amount of energy through primary winding $W_P$ of transformer 51), the amount of energy applied to the secondary winding $W_S$ of transformer 51 can be changed, which alters or regulates the induced secondary resonating voltage applied to the load (identified as $C_{OSC}$).

With the circuitry set forth in FIG. 2, at the end of each pulse period generated by the control electronics 41 to transistors Q1, Q2 and/or Q3, any residual energy stored in current limiting inductor $L_{LIM}$ is forced to ring back into storage capacitor $C_{REC}$ through free-wheeling diodes D1 and D2 by the forced commutation of active free-wheel transistor Q2. Preferably, transistors Q1, Q2 and Q3 are equivalent devices and, more preferably, insulated gate bipolar transistor (IGBT) switch modules having the desired power ratings. Those of skill in the art will realize that other similar devices (e.g., metal oxide semiconductor field effect transistors (MOSFETs) and isolated gate control thyristors (IGCTs)) could be used depending on system requirements. Further, current limiting inductor $L_{LIM}$ can be optimized for various powers or frequencies. While transient varistors $VR1_{TRANS}$ and $VR2_{TRANS}$ are optional, their inclusion is desirable to assist in the prevention of unexpected voltage surges, primarily from transformer leakage inductance. Preferably, transient varistors $VR1_{TRANS}$ and $VR2_{TRANS}$ are rated within a range of 700–1000 volts. In the preferred embodiment the design of resonant power switch 31 provides a high frequency bypass assembly, transient circuit protection, transistor switching networks, and a current limiting inductor.

Control electronics 41 is of conventional design that controls the timing and pulse width of the transistors Q1, Q2 and Q3 by conventional methods known in the art. However, because transistors Q1, Q2 and Q3 float at the potential of the utility power grid, control electronics 41 must communicate with the resonant power switch 31 by optic coupling 33 which is, preferably, a fiber optic communications cable as illustrated in FIGS. 1 and 2. Other isolation techniques would work (e.g., isolation transformers).

As seen in FIG. 2, $R_{EQ}$ is an equalizing resistor which may be set to assist in establishing the initial operating conditions of the present invention. In particular, $R_{EQ}$ is used to start and maintain voltage equilibrium between $C_{STORE}$ and $C_{REC}$, when the system is idle, and sets the initial conditions at turn-on.

Figure 3A:
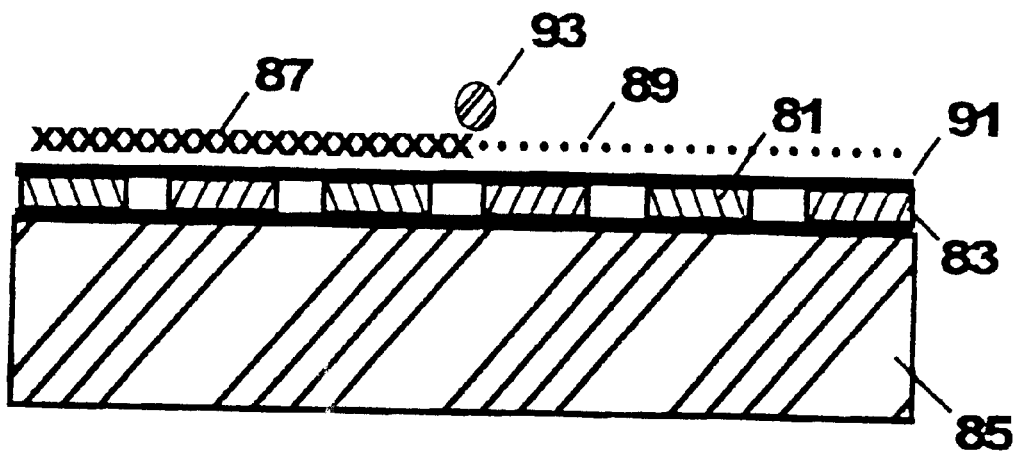
FIG. 3A is a partial cross-section of the transformer core illustrating the relationship between the primary and secondary windings.
Figure 3B:
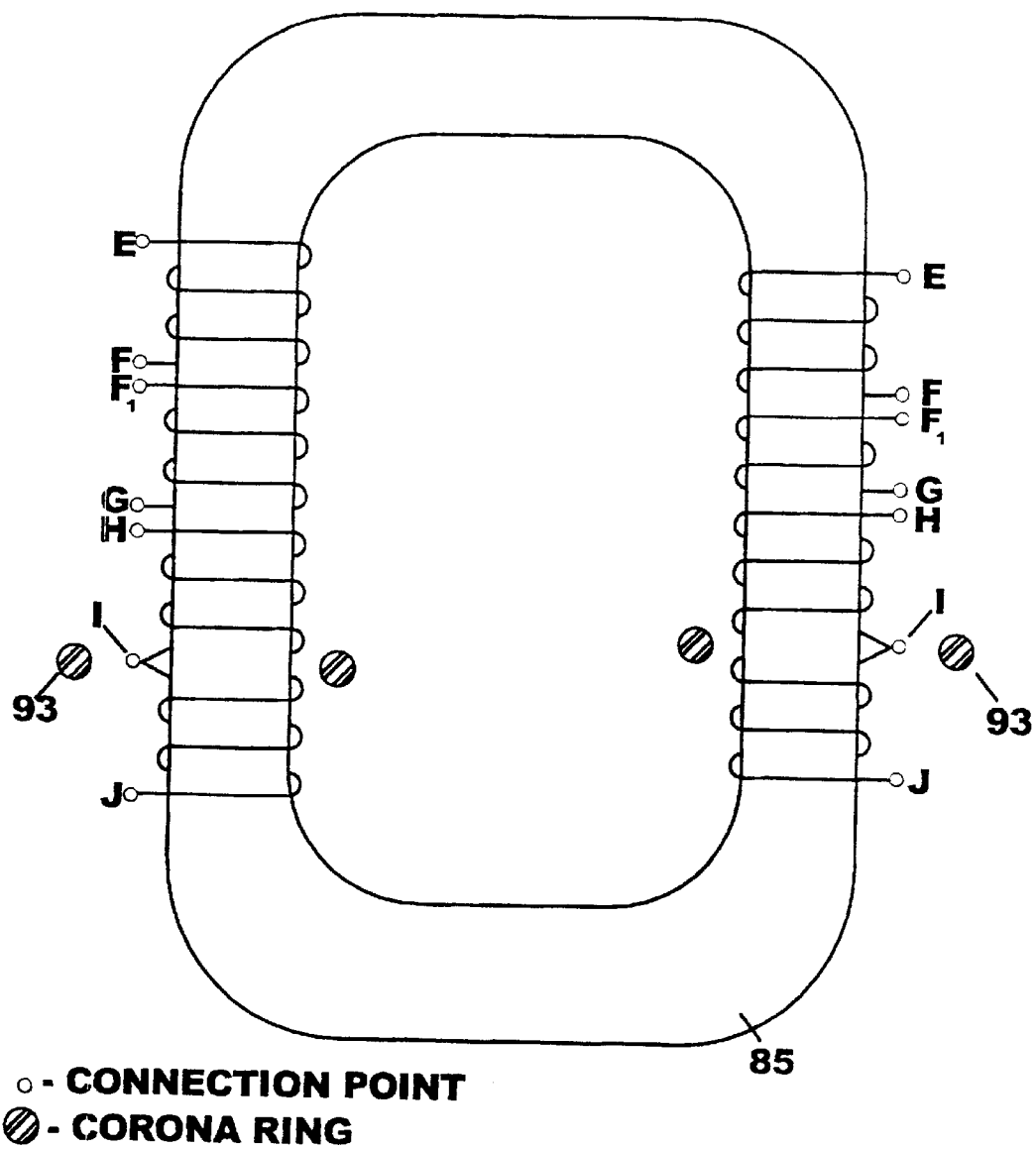
FIG. 3B is a plain view schematic of the transformer of the present invention showing the primary and secondary windings pulled apart for purposes of illustration (instead of in their actual, overlapping configuration)

Transformer 51, illustrated in FIGS. 2, 3A and 3B, is a high-frequency transformer that has a high electrical efficiency at the frequency of operation. This means that it has a low winding power loss, high self-resonant frequency, and low leakage inductance to transfer power efficiently. Low primary winding power loss is obtained with the utilization of two parallel wires in 81 and 83 in a single winding layer of flat strap conductor, litz or braid, closely coupled to the core 85. See FIG. 3A. This technique provides a high current rating and low resistive and skin depth losses. Additionally, for each transformer leg (or post), is then wound with two mono-planar secondary windings 87 and 89, each insulated from primary windings 81 and 83 by insulation 91. Again, see FIG. 3A. Finally, the primary windings from each leg of the transformer are parallel connected to the windings on the opposite transformer leg (or post). This winding configuration is interconnected to the power switching transistors Q1, Q2, and Q3, as illustrated in FIG. 2, such that symmetrical drive flux to both transformer core legs is derived for each pulse, whether generating the positive or negative half wave.

To couple transformer magnetic flux efficiently between the primary and secondary, all winding sets are wound with a single layer. Again, see FIG. 3A. To further maximize the magnetic flux coupling, the winding space between the primary and secondary is minimized. With this minimization of distance, the high secondary voltage and related high frequency present a problem of arcing and short circuiting. To ameliorate the affects of the secondary high voltage and high frequency, a special winding technique for the secondary is also used. Specifically, a split mirror winding is used for each of the secondary windings on each leg of the transformer. See FIG. 3B. The winding initially starts at H, winds to the middle I of the transformer post assembly, and then reverses pitch back down to the other end J. The start and end are then connected to each other and grounded. This results with the high-voltage being in the middle of the assembly. The secondary winding assemblies for both legs of the transformer are then parallel connected to one another. This results with four parallel single layer secondary windings, with the two high voltage nodes I, I in the center. The center connection of the high-voltage provides field gradients around the transformer that are constant potentials to other structures. This design provides the highest electrical safety margin for the transformer along with the desired parameters of low loss, highest power transfer efficiency, and high resonant frequency. To control the electric field at the high voltage output, a corona ring 93 is provided as schematically illustrated in FIGS. 3A and 3B.

Transformer 51 is designed to couple energy, preferably short pulses of energy, to the secondary oscillating circuit 61 and, thus, provide controllable, highly efficient, high frequency, high voltage power to the load $C_{OSC}$.

Secondary oscillating circuit 61 includes oscillating inductor $L_{OSC}$ and capacitor (or, load) $C_{OSC}$. The ratio of $L_{OSC}$ and $C_{OSC}$ determine the operating resonant frequency for the load to be driven. RG220, in FIG. 2, is a high voltage transmission cable to provide interconnection.

Energy recovery electronics 71 includes isolating diodes D1, D2 and D3, capacitor $C_{REC}$ and recovery inductor $L_{REC}$. Preferably, $C_{REC}$ is a 1 $\mu$F capacitor, while recovery inductor $L_{REC}$ is a 110 $\mu$H inductor. Because active free-wheel transistor Q2 operates synchronously with each of transistors Q1 and Q3, at the end of each pulse cycle generated by control electronics 41, any residual current in the current limiting inductor $L_{LIM}$ is free-wheeled (using free-wheeling diodes D1 and D2) with Q2 turn off, forcing current back to storage capacitor $C_{REC}$. The use of diode D3 and recovery inductor $L_{REC}$ as illustrated in FIG. 2 allows $C_{REC}$ and $C_{STORE}$ to operate at different frequencies. $C_{STORE}$ operates at 60 Hz. $C_{REC}$ operates at a faster time scale, depending on the frequency of the power output of the secondary winding Ws.

In operation, control electronics 41 controls and drives the resonant power switch 31, controlling transistors Q1, Q2 and Q3. In particular, control electronics 41 is used to generate the desired pulse width and timing signals to each of transistors Q1, Q2 and Q3. By controlling the pulse widths to each of the transistors the output power (magnitude) to the load oscillator circuit can be regulated. The wider the pulse width the greater the power and voltage. Similarly, by adjusting the repetition rate of the pulses generated to each of the transistors Q1, Q2 and Q3, the output frequency to the load can be optimized. These operational modes are illustrated in FIGS. 4A and 4B. As seen in FIG. 4A, with a larger pulse width, the power to the load increases as transistors Q1 and Q2 are pulsed to begin a positive polarity phase. When transistors Q2 and Q3 are pulsed, the power to the load alternates to the negative polarity phase. Similarly, as seen in FIG. 4B, with a narrow pulse width the power to the load decreases.

The present invention is useful in those applications, for example, which require generation and control of a large amount of high frequency power to a load in a controlled manner. One such application, for example, is for use with a non-linear silent discharge plasma (SDP) cells. The present invention, when used with SDP cells, can be applied to large commercial installations, such as semiconductor gas processing, chemical processing, flue-gas process remediation for cleaning solvents, adhesive vapor remediation, as well as pyrolysis of off-gases. The present invention is also useful for those defense programs which are adopting or have adopted a zero emissions policy from manufacturing or processing facilities.

Other variations and modifications of the present invention will be apparent to those skilled in the art, and it is the intent of the appended claims that such variations and modifications be covered. The particular values and configurations discussed above can be varied, are cited to illustrate the preferred embodiment of the present invention, and are not intended to limit the scope of the invention.

What is claimed is:

1. An apparatus receiving input power for high frequency alternating power generation to a load, said apparatus comprising:

a. means for energy storage, said means for energy storage being connectable to said input power;

b. resonant power switching means, in communication with said means for energy storage, for providing high frequency pulses, transient circuit protection and power limiting said resonant power switching means including a current limiting electrical device, first and third transistors in communication with said input power, and a second transistor in communication with said current limiting electrical device and said means for energy storage, said second transistor being a force commutated free-wheel transistor operating synchronously with said first transistor and said third transistor;

c. means, in communication with said resonant power switching means and said means for energy storage, for energy recovery, said means for energy storage storing energy from said input power and said means for energy recovery;

d. means for controlling said resonant power switching means, said means for controlling including means for electrically isolating said means for controlling from said resonate power switching means;

e. transformer means in communication with said resonant power switching means; and f. secondary oscillating circuitry means in communication with said transformer means and said load.

2. The apparatus of claim 1, further including a means, in communication with said means for energy storage, for rectifying AC current to DC current.

3. The apparatus of claim 1, wherein, said first, second and third transistors are, plurality of transistors configured in a push-pull arrangement, each said transistor being controlled and driven by said means for controlling said resonant power switching means to generate a desired voltage signal across said secondary oscillating circuitry means.

4. The apparatus of claim 1, wherein said current limiting electrical device is an inductor.

5. The apparatus of claim 1, further including an equalizing resistive means in communication with said second transistor, for initiating and maintaining equilibrium between said means for energy storage and said means for energy recovery.

6. The apparatus of claim 1, wherein the first, second and third transistors are insulated gate bipolar transistor switch modules.

7. The apparatus of claim 1, wherein said resonant power switching means further includes a plurality of varistor means, said varistor means being in communication with said first and third transistors, and said current limiting electrical device, for limiting voltage surge.

8. The apparatus of claim 1, wherein said secondary oscillating circuitry means includes an oscillating inductor, the ratio of said oscillating inductor to said load creating a desired operating resonant frequency to drive said load.

9. The apparatus of claim 1, wherein said transformer means includes a core, means for achieving low winding power loss and high self-resonant frequency, and means for achieving low leakage inductance.

10. The apparatus of claim 9, wherein said means for achieving low power winding loss and high self resonate frequency includes primary and secondary windings closely coupled to said core.

11. The apparatus of claim 10, wherein said primary winding is a single winding layer and wherein said secondary winding layer is a single winding layer.

12. The apparatus of claim 9, wherein said core includes a plurality of legs, each of said legs including both primary and secondary windings.

13. The apparatus of claim 12, wherein said resonant power switching means includes a plurality of transistors configured in a push-pull arrangement, each said transistor being controlled and driven by said means for controlling said resonant power switching means, whereby each of said core legs is driven for each pulse, whether a positive generating pulse or a negative generating pulse, from said transistors.

14. A high frequency alternating power generator, in electrical communication between an input power source and a load, said generator comprising:
   a. means for input power rectification, said means for input power rectification receiving said input power;
   b. means for energy storage, said means for energy storage being in electrical communication with said means for input power rectification;
   c. resonant power switching means, in electrical communication with said means for energy storage, said resonant power switching means including a plurality of transistors in a push-pull circuit arrangement and a current limiting device said plurality of transistors including first and third transistors in communication with said input power, and a second transistor in communication with said current limiting device and said means for energy storage, said second transistor being a forced commutation free-wheel transistor operating synchronously with said first transistor and said third transistor;
   d. means for energy recovery, said means for energy storage being in electrical communication with said resonant power switching means and said means for energy storage;
   e. means for controlling said resonant power switching means including means for isolating said means for controlling from said resonant power switching means;
   f. transformer means in electrical communication with the resonant power switching means; and
   g. secondary oscillating circuitry means in electrical communication with said transformer means and said load, said means for controlling said resonant power switching means controlling and driving each of said transistors to operate at a predetermined conduction angle to generate a predetermined voltage signal across said secondary oscillating circuitry means to control the magnitude of the power to said load and optimize the output frequency to said load.

15. The generator of claim 14, wherein said first, second and third transistors are insulated gate bipolar transistor switch modules.

16. A method for high frequency alternating power generation, said method comprising the steps of:
   a. providing input power;
   b. transmitting said power to a capacitor in communication with a current limiting device and to a pair of diodes in communication with said current limiting device and said capacitor;
   c. transmitting said stored energy to a resonant power switching means;
   d. controlling said resonant power switching means to generate and regulate a high frequency signal;
   e. transmitting said high frequency signal to a means for energy recovery to generate recovered energy;
   f. transmitting said recovered energy to said means for storing energy;
   g. further transmitting said high frequency signal with a transformer means to produce a transformed power signal; and
   h. transmitting said transformed power signal to a secondary oscillating circuitry means and load.

17. An apparatus receiving input power for high frequency alternating power generation to a load, said apparatus comprising:
   a. means for energy storage, said means for energy storage being connectable to said input power;
   b. resonant power switching means, in communication with said means for energy storage, for providing high frequency pulses, transient circuit protection and power limiting;
   c. means, in communication with said resonant power switching means and said means for energy storage, for energy recovery, said means for energy storage storing energy from said input power and said means for energy recovery, said means for energy recovery further including an energy recovery capacitor in communication with a current limiting electrical device, and a pair of isolating diodes in communication with said current limiting electrical device and said energy recovery capacitor;
   d. means for controlling said resonant power switching means, said means for controlling including means for electrically isolating said means for controlling from said resonate power switching means;
   e. transformer means in communication with said resonant power switching means; and
   f. secondary oscillating circuitry means in communication with said transformer means and said load.

18. The apparatus of claim 17, further including a plurality of transistors, said plurality of transistors comprising a first and third transistors in communication with said input power, and a second transistor in communication with said current limiting electrical device and said pair of isolating diodes.

* * * * *